US007661074B2

(12) United States Patent
Sadler et al.

(10) Patent No.: US 7,661,074 B2
(45) Date of Patent: Feb. 9, 2010

(54) KEYBOARD ACCELERATOR

(75) Inventors: Jennifer Sadler, Seattle, WA (US); Jensen M. Harris, Kirkland, WA (US); Lou Nell Gerard, Kirkland, WA (US); Preethi Ramani, Seattle, WA (US); Thomas C. Kerrigan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 45 days.

(21) Appl. No.: 11/173,630

(22) Filed: Jul. 1, 2005

(65) Prior Publication Data

US 2007/0002026 A1 Jan. 4, 2007

(51) Int. Cl.
*G06F 3/048* (2006.01)
(52) U.S. Cl. .................. 715/827; 715/773; 345/168; 345/503
(58) Field of Classification Search ................ 715/773, 715/827; 345/168, 503
See application file for complete search history.

(56) References Cited

U.S. PATENT DOCUMENTS

| 5,121,477 | A | * | 6/1992 | Koopmans et al. | .......... 715/762 |
| 5,525,978 | A | * | 6/1996 | York et al. | ..................... 341/22 |
| 5,617,527 | A | * | 4/1997 | Kressin et al. | .............. 715/840 |
| 5,694,562 | A | * | 12/1997 | Fisher | ........................ 715/839 |
| 5,721,850 | A | * | 2/1998 | Farry et al. | ................. 715/700 |
| 5,796,404 | A | * | 8/1998 | Gentner | ...................... 715/823 |
| 6,069,628 | A | * | 5/2000 | Farry et al. | .................. 715/835 |
| 6,078,323 | A | * | 6/2000 | Gest | ........................... 715/711 |
| 6,199,125 | B1 | * | 3/2001 | Cortesi | ........................ 710/67 |
| 6,323,853 | B1 | * | 11/2001 | Hedloy | ....................... 715/810 |
| 6,898,765 | B2 | * | 5/2005 | Matthews et al. | .......... 715/815 |
| 6,907,577 | B2 | * | 6/2005 | Tervo | ......................... 715/827 |
| 2002/0126153 | A1 | * | 9/2002 | Withers et al. | ............. 345/773 |
| 2004/0119732 | A1 | | 6/2004 | Grossman et al. | |
| 2005/0044524 | A1 | * | 2/2005 | Murray et al. | .............. 717/101 |

OTHER PUBLICATIONS

PCT International Search Report in PCT/US06/25999 mailed Sep. 25, 2007.
About Microsoft: Your Potential. Our Passion, http://web.archive.org/web/20040815030226/http://www.microsoft.com/mscorp/innovati, Aug. 15, 2004, pp. 5.
Chinese Second Office Action dated Sep. 4, 2009 cited in Application No. 200680023150.8.
Chinese First Office Action dated Feb. 27, 2009 cited in Application No. 200680023150.8.

\* cited by examiner

*Primary Examiner*—Weilun Lo
*Assistant Examiner*—Tuyetlien T Tran
(74) *Attorney, Agent, or Firm*—Merchant & Gould (57) ABSTRACT

Improved keyboard accelerators are provided for executing functionalities of a software application utilizing text-based and non text-based buttons or controls. Upon selection of a prescribed keyboard accelerator initiation key, for example, the "Alt" key, a keyboard accelerator key tip in the form of a small window is displayed over the functionality buttons or controls displayed in a deployed user interface. Each key tip is labeled with one or more text characters for informing a user as to a secondary keyboard selection that must be made to execute the associated functionality.

16 Claims, 9 Drawing Sheets

KEYBOARD ACCELERATOR

BACKGROUND

With the advent of the computer age, computer and software users have grown accustomed to user-friendly software applications that help them write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects. Modern database applications allow users to store, organize and exchange large amounts of data.

Most of such applications provide a user interface through which a number of individual buttons or controls may be selected for providing desired functionalities in documents and/or data. For example, buttons or controls may be selected for saving data, formatting data, organizing data, copying data, and the like. Prior applications often provide keyboard accelerators for allowing a user to quickly select and execute a given functionality without navigating to an associated button or control in a menu of controls. Such keyboard accelerators also allow efficient access to functionality when an associated computer is not equipped with selection devices, such as mouse or electronic pen devices. In most prior applications, keyboard accelerators include a keyboard key selection associated with a text character in a text-based name of the selected control. For example, a common keyboard accelerator for executing a "File" command includes selecting the keyboard "Alt" or "Ctrl" keys followed by selecting an "F" key. If a secondary function contained in an associated "File" menu is desired, for example, a "Save" function, then a secondary keystroke, for example, the "S" key may be selected for executing the secondary function. Users are typically informed of the availability of such keyboard accelerators by the display of an underline marking under a character of a text-based control. For example, the character "F" may be underlined in a text-based control for a "File" function, and the character "S" may be underlined in a text-based control for a "Save" function for informing users as to the keyboard accelerator keystrokes required for selecting the associated controls.

A problem occurs, however, when new or different user interfaces are developed and utilized for software applications that do not utilize text-based names for many selectable functionality controls. Some user interfaces provide selectable controls as graphical symbols or icons or as a mixture of graphical icons and some text-based controls. The prior approach of informing users of the presence of a keyboard accelerator by underlining a text character in text-based controls is ineffective for such new or different user interfaces containing one or more graphical icon-based controls.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments of the present invention solve the above and other problems by providing improved keyboard accelerators for executing functionalities of a software application utilizing both text-based and non text-based controls without the need for navigating through a menu of commands to select a control associated with a desired function and without the need for using a series of navigation controls. According to aspects of the present invention, upon selection of a prescribed keyboard accelerator initiation key, for example, the "Alt" key, a keyboard accelerator key tip in the form of a small window is displayed over the functionality controls displayed in a deployed user interface. Each key tip is labeled with one or more text characters for informing a user as to a secondary keyboard selection that may be made to execute the associated functionality. If two key tips bear the same label character, for example, where a third party add-in software application adds a key tip with the same label as an existing key tip, a second text character may be added to the label to distinguish the added key tip from the existing key tip.

Buttons or controls for some related functions may receive key tips bearing two text characters where the first of the two characters is identical for the related key tips, for example "AB" and "AC." For such key tips, a first selection of the first character causes a dismissal of all key tips other than those bearing the same first character. A second selection of a second character of one of the related key tips causes an execution of the function associated with the key tip bearing the second selected character.

Keyboard accelerator key tips utilized according to aspects of the present invention may be highlighted with a coloring or shading to distinguish them from other components of an associated user interface. Other distinguishing properties may be applied, for example, dimming a display of other user interface components contained in a given user interface for further highlighting the presence of the key tips applied to one or more functionality controls in the given user interface.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

As briefly described above, embodiments of the present invention are directed to improved keyboard accelerators for allowing the selection of one or more functionalities of a given software application without the need for navigating through one or more menus of controls for one or more selectable controls associated with desired functionalities. According to embodiments of the present invention, keyboard accelerator key tips are displayed over selectable controls displayed in a software application user interface for informing a user of keyboard accelerator keystrokes required for automatically executing associated functionalities.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
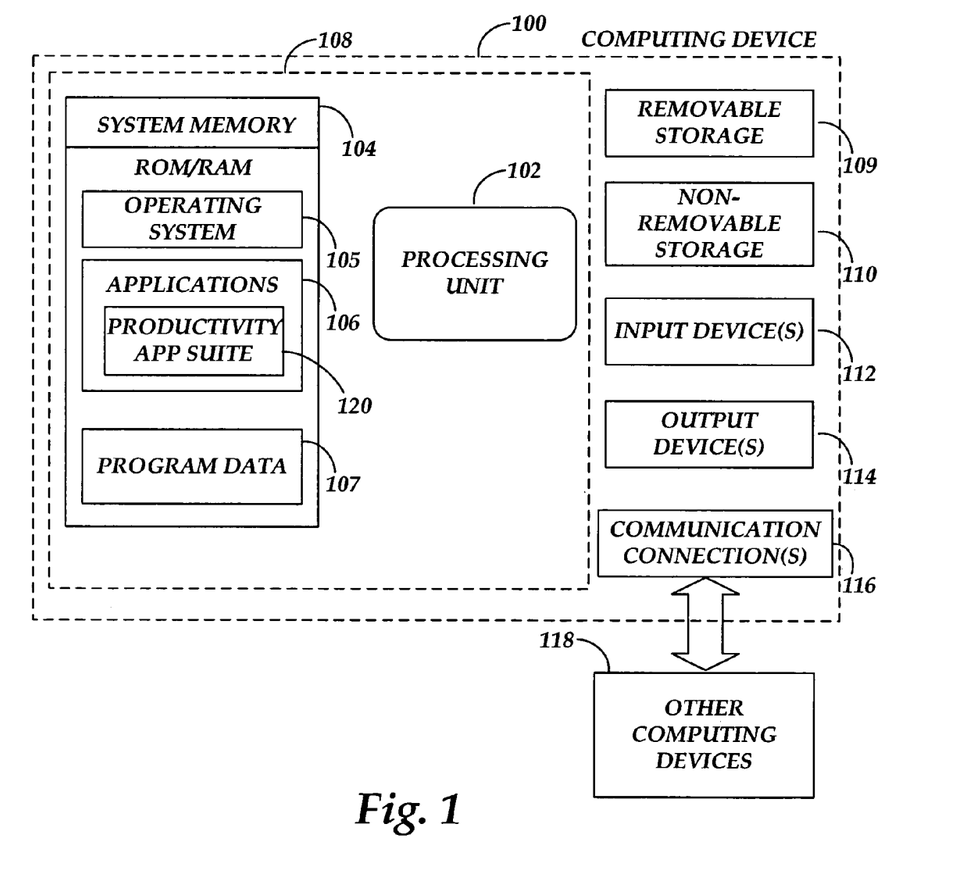
FIG. 1 illustrates an exemplary computing operating environment for embodiments of the present invention.

Referring now to the drawings, in which like numerals refer to like elements through the several figures, aspects of the present invention and an exemplary computing operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Embodiments of the invention may be implemented as a computer process (method), a computing system, or as an article of manufacture, such as a computer program product or computer readable media. The computer program product may be a computer storage media readable by a computer system and encoding a computer program for executing a computer process. The computer program product may also be a propagated signal on a carrier readable by a computing system and encoding a computer program for executing a computer process.

With reference to FIG. 1, one exemplary system for implementing the invention includes a computing device, such as computing device 100. In a basic configuration, the computing device 100 typically includes at least one processing unit 102 and system memory 104. Depending on the exact configuration and type of computing device, the system memory 104 may be volatile (such as RAM), non-volatile (such as ROM, flash memory, etc.) or some combination of the two. System memory 104 typically includes an operating system 105 suitable for controlling the operation of a networked personal computer, such as the WINDOWS® operating systems from MICROSOFT CORPORATION of Redmond, Wash. The system memory 104 may also include one or more software applications 106 and may include program data 107. This basic configuration is illustrated in FIG. 1 by those components within dashed line 108.

According to embodiments of the invention, the application 106 may comprise many types of programs, such as an electronic mail program, a calendaring program, an Internet browsing program, and the like. An example of such programs is OUTLOOK® manufactured by MICROSOFT CORPORATION. The application 106 may also comprise a multiple-functionality software application for providing many other types of functionalities. Such a multiple-functionality application may include a number of program modules, such as a word processing program, a spreadsheet program, a slide presentation program, a database program, and the like. An example of such a multiple-functionality application is OFFICE™ manufactured by MICROSOFT CORPORATION. According to embodiments of the present invention, the applications 106 are illustrative of any software application that provides one or more selectable controls in a user interface for which keyboard accelerators of the present invention may be used for automatically selecting associated functionalities of the applications 106.

The computing device 100 may have additional features or functionality. For example, the computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

The computing device 100 may also contain communication connections 116 that allow the device to communicate with other computing devices 118, such as over a network in a distributed computing environment, for example, an intranet or the Internet. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
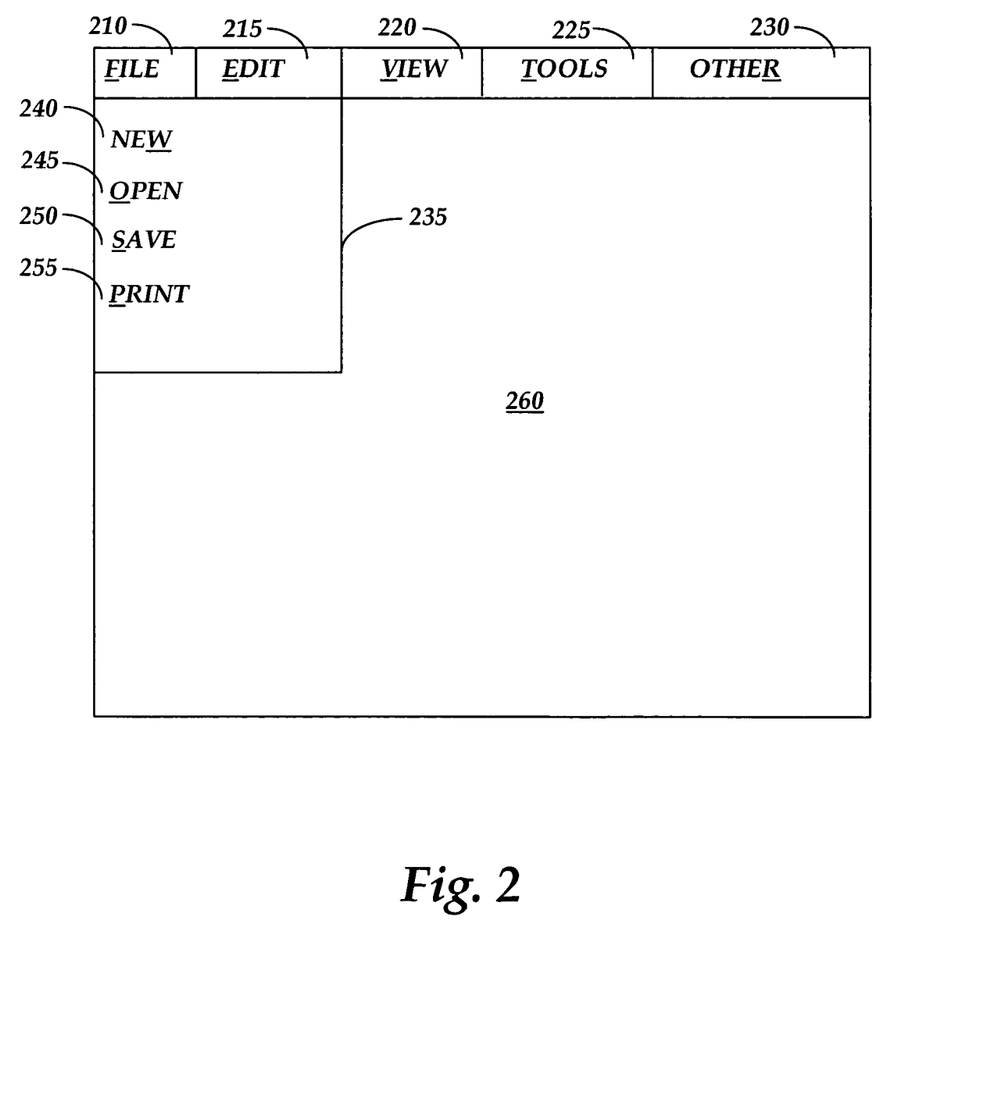
FIG. 2 illustrates a computer screen display of a prior user interface showing prior keyboard accelerator identifications.

FIG. 2 illustrates a computer screen display of a prior user interface showing prior keyboard accelerator identifications. According to the prior user interface components illustrated in FIG. 2, each top level command 210, 215, 220, 225, 230 bears a text-based command label, for example, "File," "Edit," "View," etc. Each of the text-based command labels contains an underlining marking under one of the text characters contained in the text-based label. For example, the "File" label includes an underlining marking under the "F" character. A drop-down menu 235 is illustrated deployed under the "File" command bearing additional selectable controls including the "New" control, the "Open" control, etc. Each of the text-based labels for the controls 240, 245, 250, 255 illustrated in the drop down menu 235 similarly includes an underlining marking under one of the text characters contained in each of the text-based controls. For example, the "New" document control 240 includes an underlining marking under the "W" character. As should be appreciated, the user interface 200 and the individual text-based controls illustrated in the user interface 200 are for purposes of example only and are not limiting or restrictive of the different user interface types and layouts to which embodiments of the present invention may be applied.

According to prior keyboard accelerator methods, selection of one of the displayed controls may be performed by selecting a keyboard accelerator initiation key, such as the "Alt" key or the "Ctrl" key, following by a keyboard selection of the underlined character in the desired text-based control. For example, for selecting the "File" control 210, a user may, according to prior methods, first select the "Alt" key, followed by a selection of the "F" key for automatically selecting the functionality associated with the "File" control 210. If a secondary control is desired, for example, a control in the drop down menu 235, a secondary keyboard selection may be entered after the first keyboard selection. Thus, if a user desires the functionality associated with the "Save" control 250 in the menu 235, the user may select the "Alt" key, followed by the "F" key, followed by the "S" key for automatically selecting the "Save" functionality of the associated software application.

Figure 3:
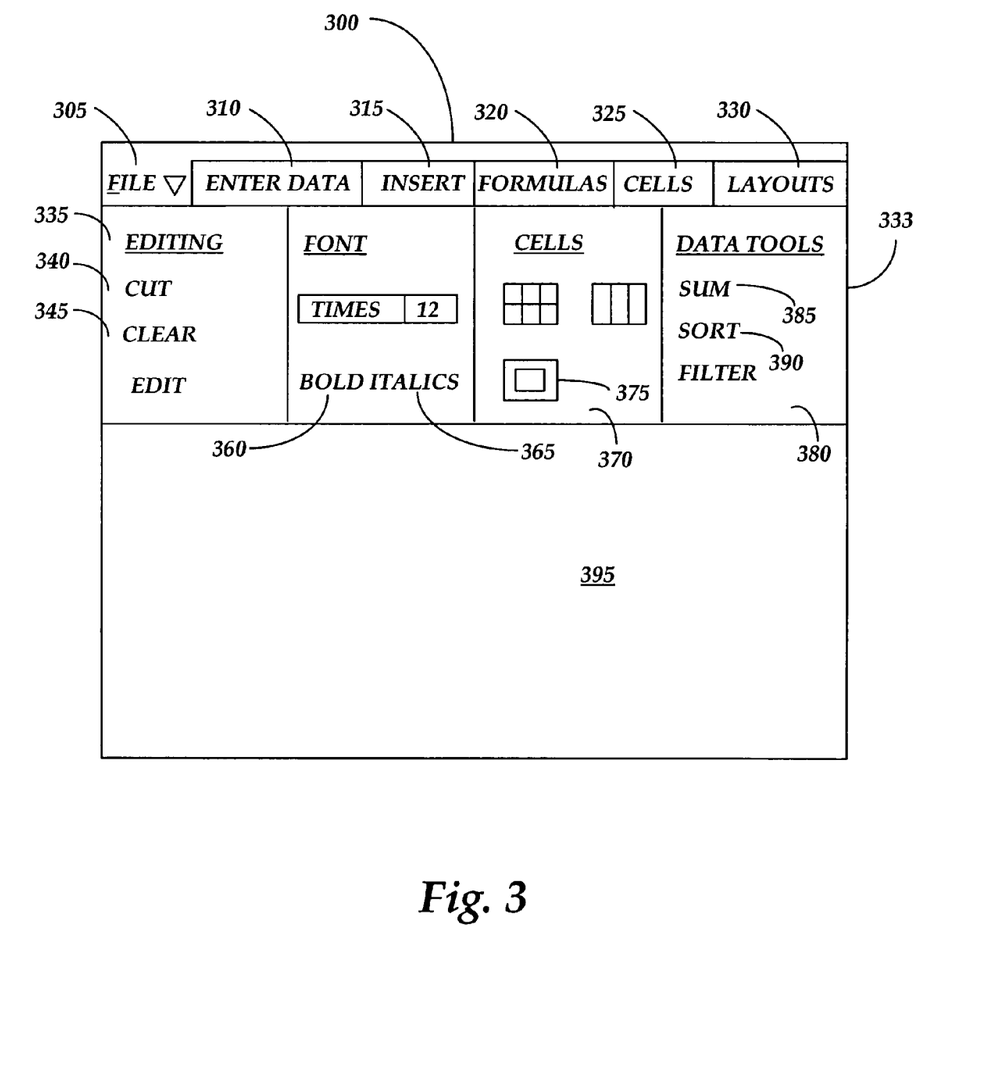
FIG. 3 illustrates a computer screen display of a new or modified user interface showing user interface components organized in logical groupings under one or more functional tabs.

FIG. 3 illustrates a computer screen display of a new or modified user interface showing user interface components organized in logical groupings under one or more functional tabs. According to the new or modified user interface 300, a number of functionality controls are provided that are not in the form of text-based controls and for which prior keyboard accelerator identifications (as illustrated in FIG. 2) are not effective. The user interface 300, illustrated in FIG. 3, is a tab-based user interface containing one or more tabs 305, 310, 315, 320, 325, 330 associated with corresponding tasks that may be performed using the functionalities of the associated software application. The user interface 300 is associated with an example spreadsheet application. For example, the tab 310 is associated with a task for entering data into a spreadsheet document. The tab 315 is associated with inserting one or more data objects into a spreadsheet document. The tab 320 is associated with inserting, utilizing, or modifying formulas applied to a spreadsheet document, and so on. When a given tab 305, 310, 315, 320, 325, 330 is selected, a user interface component (hereafter UI component) 333 beneath the tabs is populated with logical groupings of functionality buttons or controls for performing a task associated with the selected tab.

The logical groupings of functionality buttons or controls may contain one or more buttons or controls associated with a subtask under the main task. For example, if a task associated with the "Enter Data" tab 310 is selected, the user interface component 333 may be populated with one or more logical groupings of functionality buttons or controls for entering, manipulating or otherwise utilizing data in a spreadsheet application document. For example, a first logical grouping of buttons or controls illustrated under the "Enter Data" tab 310 is associated with editing data in a spreadsheet application document. A second logical grouping of buttons or controls associated with the "enter data" task may include buttons or controls associated with formatting properties that may be applied to text or data entered into a spreadsheet application document. A third logical grouping of buttons or controls illustrated in FIG. 3 is associated with cell structure and organization of a spreadsheet application document, and a fourth logical grouping of buttons or controls illustrated in FIG. 3 is associated with data tools for organizing and utilizing data contained in a spreadsheet application document.

As should be understood, the user interface 300 illustrated in FIG. 3 is for purposes of example only and is not limiting or restrictive of the number and types of user interfaces applicable to embodiments of the present invention. For example, the user interface 300 is illustrative of a user interface that may be utilized for a word processing application, a slide presentation application, a notes application, an electronic mail application, a calendaring application, and the like. As should be appreciated, individual functionality buttons and controls illustrated in the user interface 300 would be different based on the different software applications for which the user interface 300 is provided. That is, for a word processing application, the tabs 305-330 would be associated with tasks related to utilizing word processing applications. Likewise, the logical groupings of functionality buttons and controls displayed in the user interface component 333 underneath the tabs 305-330 would include logical groupings of buttons and controls associated with word processing tasks.

Figure 4:
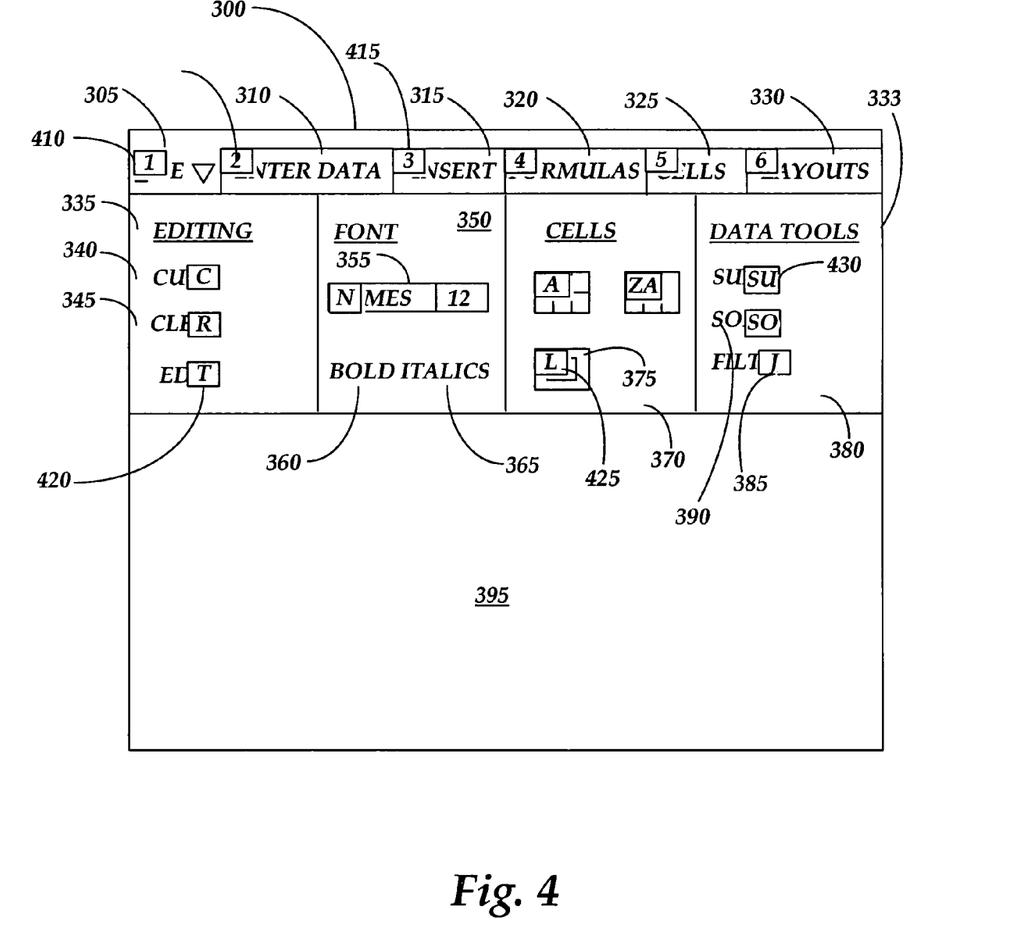
FIG. 4 illustrates the computer screen display of FIG. 3 showing one or more keyboard accelerator key tips according to embodiments of the present invention.

As briefly described above, many of the functionality buttons and controls provided in a user interface, such as the new or modified user interface 300, may or may not be text-based buttons or controls. For example, some buttons or controls may be in the form of graphical icons such as those illustrated in the logical grouping 370, illustrated in FIG. 3. For such graphical icon-based buttons or controls, prior keyboard accelerators described above with respect to FIG. 2 are not effective. Referring now to FIG. 4, according to embodiments of the present invention, keyboard accelerator key tips 410, 415, 420, 425, 430 are displayed over functionality buttons and controls in the user interface 300 for informing a user as to a keyboard accelerator key stroke required for automatically selecting associated functionality. As illustrated in FIG. 4, keyboard accelerator key tips may be deployed over text-based and non text-based buttons or controls. As should be appreciated, one advantage of using key tips for both text-based and non text-based buttons or controls is that the accelerator key does not need to be part of the name of the control. This allows use of the same accelerator keys for all languages even if the control names are localized according to a particular language.

According to embodiments of the present invention, upon selection of a keyboard accelerator initiation key, for example, the alternate ("Alt") key or the control ("Ctrl") key or any other suitable key designated for initiating a keyboard accelerator, the keyboard accelerator key tips are automatically disposed over corresponding functionality buttons or controls contained in the user interface 300, as illustrated in FIG. 4. According to one embodiment, upon selection of the keyboard accelerator initiation key (hereafter "initiation key"), the keyboard accelerator key tips (hereafter "key tips") are automatically and quickly deployed, as illustrated in FIG. 4. According to an alternate embodiment, upon selection of the initiation key, the key tips are deployed in a slower manner by "fading in" the key tips into their respective deployed positions. Likewise, when the key tips are dismissed, as described below, the key tips may be dismissed rapidly, or the key tips may be dismissed slowly be "fading out" the key tips from their deployed positions. According to an alternate embodiment, the order of appearance of key tips may be matched to a hierarchical organization of associated buttons or controls. For example, key tips for top-level function controls, such as the tabs 305-330, may appear first, and upon selection of a tab 305-330 key tip, key tips for each logical grouping of buttons or controls displayed under a selected tab may appear next, and upon selection of a given logical grouping key tip, key tips for individual buttons or controls contained in the selected logical grouping may appear next.

According to embodiments of the present invention, the operating system 105 of the computer 100 generates each key tip 410, 415, 420, 425, 430 as an individual display window and deploys each key tip in a position overlaying respective buttons or controls, as illustrated in FIG. 4. The individual key tips are positioned over the respective buttons or controls in a manner that allows continued identification of text or graphics associated with underlying buttons or controls. In addition, the individual key tip windows may be rendered with a variety of coloring or shading that may be used to further distinguish the individual key tip windows from surrounding user interface components or coloring. According to one embodiment, other user interface components of the user interface 300 may be dimmed, or the coloring of other user interface components may be slightly changed by the associated application or by the operating system in order to further distinguish the deployed key tips from surrounding user interface components. As should be appreciated, the key tips may be displayed according to a variety of shapes, including square shaped, rectangular shaped, circular shaped, triangular shaped, or any other shape onto which an identifying character(s) may be displayed according to embodiments of the invention described herein.

As illustrated in FIG. 4, according to one embodiment, key tips 410, 415 are deployed over top-level functionality tabs 305-330 and are labeled with numbers for identifying the key tips associated with respective tabs. According to one embodiment, numbers utilized for key tips in a given application are utilized for corresponding key tips utilized in separate, but associated applications. For example, if a given user interface 300 is associated with a spreadsheet application, and the user interface 300 includes an "Insert" tab 315, a similar "Insert" tab displayed in a user interface 300 for an associated word processing application may contain a keyboard key tip bearing the same identification number as applied to the key tip for the spreadsheet application user interface "Insert" tab. Thus, consistency is developed across associated software applications for allowing users to remember the key tips associated with like functionalities across the associated applications.

Referring still to FIG. 4, functionality buttons or controls contained in the logical groupings of controls displayed in the user interface component 333 receive keyboard accelerator key tips 420, 425, 430 overlaying each of the buttons or controls displayed in the logical groupings of controls. According to embodiments of the present invention, the key tips applied to buttons or controls contained in the logical groupings of buttons or controls are labeled with alphabetic characters. If possible, an alphabetic character label is applied to a given key tip that bears some relation to the associated button or control. For example, the character "C" is applied to the key tip associated with the "Cut" control 340.

According to embodiments of the present invention, the keyboard accelerators of the present invention are utilized by first selecting a keyboard accelerator initiation key, for example, "Alt" key or "Ctrl" key for initiating use of keyboard accelerator key tips. After selection of an initiation key, a number or letter used for labeling a key tip applied to a desired button or control must be selected for activating the associated functionality. If key tips are not presently deployed, as illustrated in FIG. 3, the initial selection of the initiation key causes the key tips for the top-level tabs 305-330 to be deployed over the corresponding tabs, and causes key tips to be deployed over functionality buttons or controls presently displayed in the logical groupings of buttons or controls. For example, if at the time the initiation key is selected, the logical groupings of buttons or controls are presently populated with buttons or controls associated with the "Enter Data" tab 310, then the key tips for each of the tabs 305-330 will be deployed, and the key tips for each of the presently displayed buttons or controls will be deployed, as illustrated in FIG. 4.

If a presently displayed button or control is needed by a user, then the user need only select the key tip associated with the desired button or control after selection of the initiation key, for example, the "Alt" key. For example, if the "Cut" control 340 is presently displayed in the user interface 300, as illustrated in FIG. 3, then in order to select the "Cut" control 340 via the keyboard accelerators of the present invention, the user will select the "Alt" key, followed by the "C" key for automatically executing the desired function. Accordingly, use of the keyboard accelerator key tips described herein allows for a "one-keystroke" selection of buttons or controls presently displayed in the user interface 300. That is, a user need not select the keyboard accelerator initiation key once to deploy key tips for top-level tabs and a second time to deploy key tips for associated functionality buttons or controls.

According to an alternative embodiment, a two-keystroke process may be employed whereby the keyboard accelerator initiation key is first selected, followed by a selection of a key tip for an associated top-level tab, followed by a selection of a key tip for a desired button or control. Alternatively, a three-keystroke process may be employed that requires typing the tab 305-330 key tip, followed by typing a logical grouping key tip, followed by typing an individual button or control key tip.

Referring still to FIG. 4, if two key tips are labeled with the same alphabetic character, for example, the character "A," an additional text character, for example, "Z," is appended to the second key tip label. Referring to FIG. 4, a first cell function control bears a key tip with a label of "A," and a second cell function control bears a label of "ZA." As should be appreciated, a third party add-in software application may provide additional functionality to the current application, for example, the addition of a cell function, and the third party add-in application may provide a keyboard accelerator key tip bearing a same alphabetic character label as a key tip already provided by the application in use or by another add-in application. When such conflicting key tip labels are encountered, the second key tip label is amended to include a secondary text character, for example, the "Z" character, for distinguishing the two keyboard accelerator key tips. On the other hand, if key tips are provided by a third party add-in application or other source, and those supplied key tips do not conflict with presently available key tips, then the added key tips are automatically displayed as described herein.

Referring still to FIG. 4, according to another embodiment, in some cases a plurality of functionalities provided by the software application in use are related in some manner. In such cases, a two-character label may be applied to the associated key tips. For example, the "Sum" control 385 has a corresponding key tip with a label "SU" and a related "Sort" control 390 has an associated key tip bearing a text label of "SO." According to embodiments of the present invention, when the first character of such related key tips is selected, for example, the "S" character, during use of the keyboard accelerators, all keyboard accelerator key tips not including the same first character are dismissed, but all two-character key tips having the selected first character remain deployed to quickly inform the user of the functionality buttons or controls associated with the first selected keyboard accelerator character. A subsequent selection of a second character applied to one or the two-character key tips, for example, the "U" character, causes an automatic selection of the functionality associated with the two-character key tip comprising the two characters selected by the user. For example, referring to FIG. 4, if the user first selects the character "S" then all key tips other than the two-character key tips having a first character of "S" will be dismissed. If the user then selects the character "U," then the functionality associated with the key tip bearing the label "SU" will be executed automatically. For example, if the user has selected a group of data in an associated spreadsheet application document for which the user wishes to total the data, the user may select the "Alt" key for initiating the keyboard accelerator functionality, followed by the "S" key, followed by the "U" key for automatically applying the "Sum" function of the associated spreadsheet application to the selected data in the spreadsheet application document.

According to embodiments of the present invention, after the keyboard accelerator key tips are deployed, as illustrated in FIG. 4, the key tips may be dismissed through various triggering mechanisms. According to one triggering mechanism, a subsequent selection of the keyboard accelerator initiation key, for example the "Alt" key, causes the presently deployed key tips to be dismissed. Other triggering mechanisms for dismissing the deployed key tips may include selection of a button or control deployed in the user interface 300 specifically implemented for dismissing the deployed key tips. Other triggering mechanisms may include dismissing the deployed key tips after a prescribed time-out period in which no additional user action associated with a deployed key tip is detected. Another example triggering mechanism may include dismissing the deployed key tips upon the selection of a different object in an associated document, for example, another data object, text object, or image object for editing according to other functionalities of the associated software application.

Referring still to FIGS. 3 and 4, the user interface component 333 containing the logical groupings of functionality buttons and controls may be scaled according to a size required for displaying the buttons or controls of an associated application. For example, if all the functionality buttons or controls may fit on a single line in the user interface component 333, then a single line of functionality buttons or controls may be displayed. If necessary, the user interface component 333 may be scaled to provide for multiple lines of displayed buttons or controls. Similarly, if the functionality of a given application is displayed on a narrow computer screen display, for example, a handheld computing device, the buttons and controls of the user interface 300 may be scaled to fit the associated computer screen display.

According to embodiments of the present invention, if the user interface 300 is deployed on a small display screen, for example, on a handheld computing device, functionality buttons or controls associated with top-level tabs may be displayed in a manner that takes up less space. For example, instead of having three separate top-level buttons for "Cut," "Clear" and "Edit," on a small screen these controls may be combined into a single "Edit" menu that drops down when selected to display the three controls for "Cut," "Clear" and "Edit." According to embodiments of the present invention, if a user selects a keyboard accelerator key tip normally displayed in a section, but not displayed because of the available screen space, the functionality associated with the selected key tip is automatically executed even though the selected key tip is not visible on the display screen. Alternatively, if a user interface 300 normally displayed on a narrow display screen is launched on a wider display screen and additional space is available for displaying additional functionality buttons and controls, the buttons and controls will be displayed along with corresponding keyboard accelerator key tips, as described herein.

According to another embodiment, if one or more logical groupings 370, 380 of functionality buttons or control is removed from display from the user interface 300, a user may still select a keyboard accelerator key tip that normally would be available in association with the removed buttons or controls that are no longer displayed in the user interface 300. For example, users who have grown accustomed to using certain keyboard accelerator key tips may select those key tips without noticing that the associated buttons or controls are no longer displayed in the user interface 300. According to one embodiment of the present invention, upon a selection of a keyboard accelerator key tip associated with a button or control that is no longer displayed in the user interface 300, a dialog may be launched on the display screen containing a selectable button or control associated with the functionality desired by the user. According to one embodiment, the user may manually select the displayed button or control, or the displayed button or control may be checked for execution automatically when the dialog is displayed.

Figure 5:
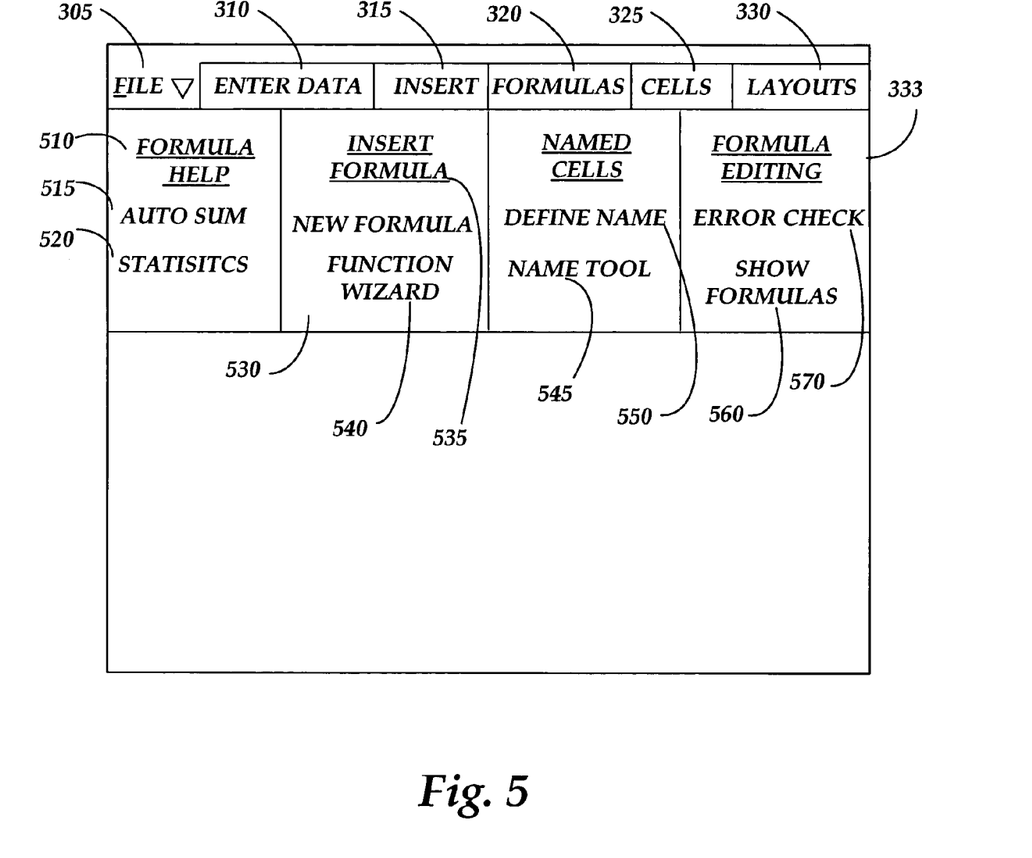
FIG. 5 illustrates a computer screen display of a new or modified user interface showing user interface components organized in logical groupings under one or more functional tabs.

Referring now to FIG. 5, according to one embodiment of the present invention, selection of a key tip associated with a different top-level tab 305-330 causes the deployment of a different set of logical groupings of functionality buttons or controls associated with the selected top-level tab. As illustrated in FIG. 5, selection of the different top-level tab, for example, the "Insert" tab 315, causes deployment of logical groupings of buttons or controls associated with the selected insert tab. According to one embodiment, key tips are not displayed for the top-level tabs or for the newly displayed logical groupings of functionality buttons or controls associated with the selected top-level tab after the user interface 300 is refreshed with new user interface components in response to the selection of the new top-level tab. That is, as should be appreciated, one use of the selection of a keyboard accelerator key tip associated with a top-level tab is the deployment of a refreshed user interface 300 containing functionality buttons or controls associated with the selected tab.

According to this embodiment, key tips are not automatically deployed for the functionality buttons or controls displayed in the UI component 333 for the newly selected top-level tab. In order to display keyboard accelerator key tips for the top-level tabs and for the displayed functionality buttons or controls displayed in response to the selected tab, the keyboard accelerator initiation key, for example, the "Alt" key, must be selected again to display key tips for the newly displayed buttons and controls. According to another embodiment, selection of a keyboard accelerator key tip associated with a different top-level tab may cause deployment of the functionality buttons and controls associated with the selected top-level tab, as illustrated in FIG. 5, and may cause automatic deployment of keyboard accelerator key tips for the newly displayed functionality buttons or controls. As should be appreciated by those skilled in the art, the associated software application may be set up by a user such that key tips are displayed for successive displays of functionality buttons or controls associated with successive selections of top-level tabs until the key tips are dismissed by a triggering mechanism, as described above.

Figure 6:
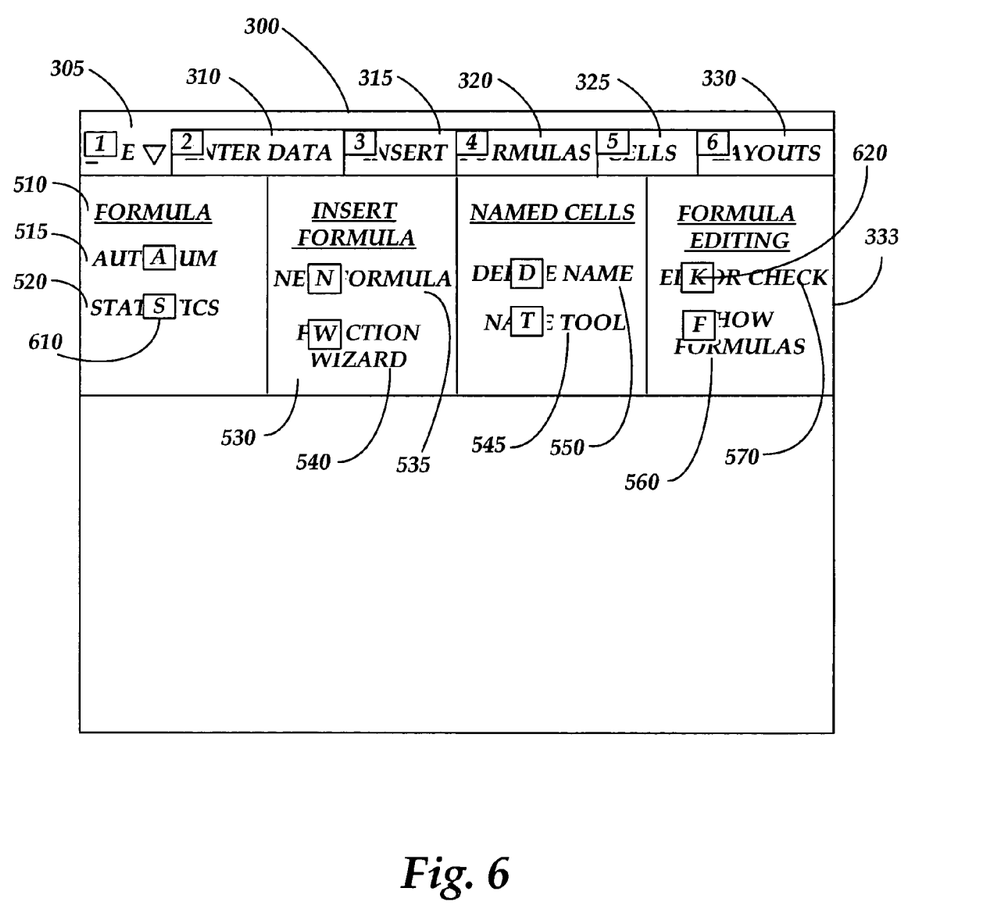
FIG. 6 illustrates the computer screen display of FIG. 3 showing one or more keyboard accelerator key tips according to embodiments of the present invention.

Referring now to FIG. 6, the user interface 300 is displayed with functionality buttons or controls 515, 520, 540, 550, etc. displayed in logical groupings in the UI component 333 in response to selection of a different top-level tab, for example, the "Insert" tab 315. After initiation of the keyboard accelerator functionality of the present invention, for example, by a selection of the "Alt" key, keyboard accelerator key tips 610, 620, etc. are automatically deployed over corresponding functionality buttons or controls now displayed for the newly selected top-level tab.

Figure 7:
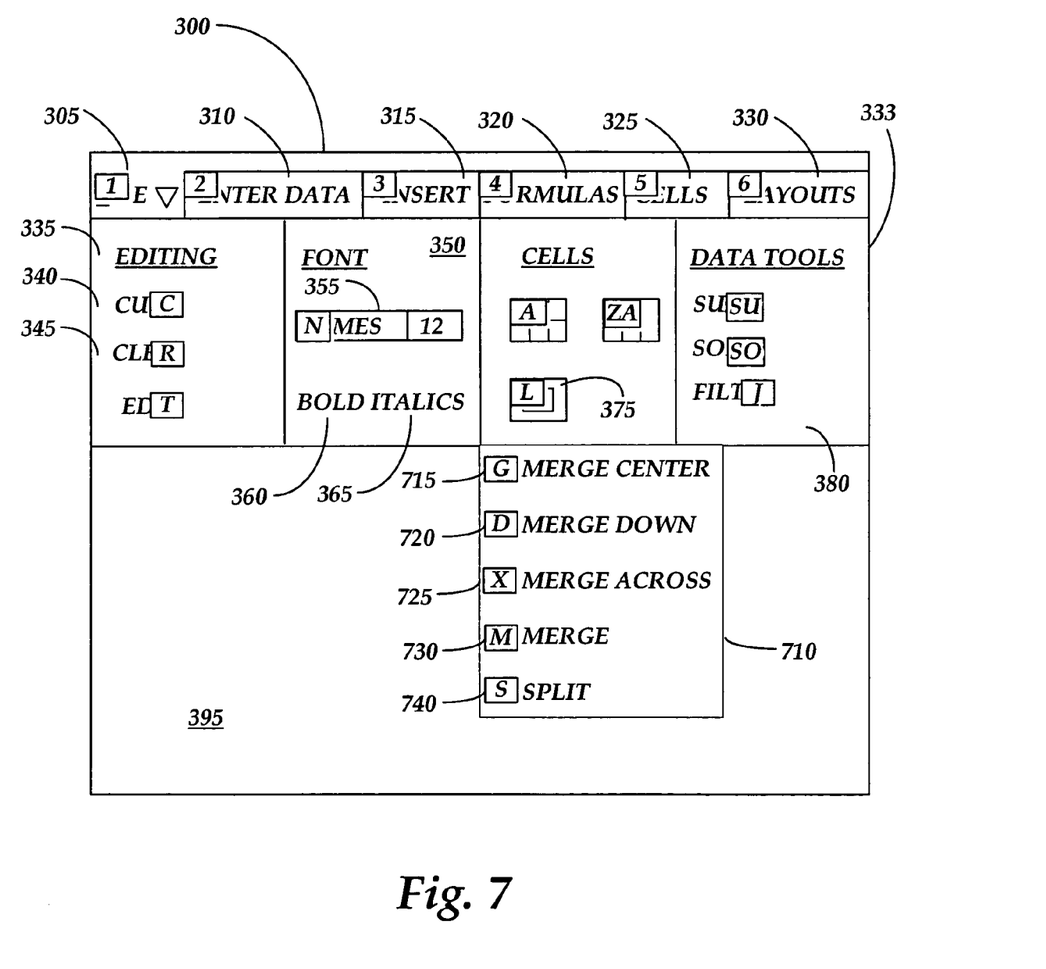
FIG. 7 illustrates the computer screen display of FIG. 3 showing a drop down menu of split button keyboard accelerator key tips according to embodiments of the present invention.

Referring now to FIG. 7, some buttons or controls displayed in the logical groupings of buttons or controls contained in the UI component 333 may be associated with a plurality of subtasks, and the user interface area of the associated button or control may not include enough display space for displaying a button or control for each of the subtasks. In such cases, selection of a keyboard accelerator key tip of a button or control associated with a plurality of subtasks may cause the deployment of a drop down menu (or other suitable pop-up menu) 710, as illustrated in FIG. 7, containing selectable buttons or controls associated with subtasks under the selected functionality. For example, selection of an example "Merge Cells" icon 375 identified by the key tip "L" in the cells grouping of selectable controls causes deployment of a drop down menu 710 containing a plurality of subtasks 715, 720, 725, 730, 740. For example, subtask controls, such as "Merge and Center," "Merge Down," "Merge Across," etc., are illustrated.

As illustrated in FIG. 7, each of the functionality controls displayed in the drop down menu 710 has an associated keyboard accelerator key tip. According to embodiments of the present invention, selection of one of the displayed key tips in the drop down menu 710 causes the automatic execution of the associated functionality. For example, a user desiring to execute the "Merge Down" functionality to data in an associated spreadsheet document may first select the "Alt" key for displaying the key tips, followed by a selection of the "L" key tip which causes an automatic deployment of the drop down menu 710, followed by a selection of the "D" key tip for automatically executing the "merge down" functionality to the selected data in the associated spreadsheet application.

According to embodiments of the present invention, keyboard accelerator key tips may be utilized in association with contextual functionalities. For example, selection of a given text or data object in a document may cause deployment in the user interface 300 of additional functionality controls that are relevant to the context of the selected object. For example, if a chart object is selected in a given spreadsheet application document, an additional top-level tab or other control may be dynamically added to the user interface 300 for providing additional functionality relevant to formatting, manipulating, or otherwise utilizing the selected chart object. According to embodiments of the present invention, a keyboard accelerator key tip may be dynamically applied to and displayed over the added top-level tab or other button or control. Subsequently, in response to selecting the key tip associated with the new top-level tab or other control, functionality available under the added tab or control may be displayed in the user interface 300. Once new functionality buttons or controls are displayed, key tips associated with individual buttons or controls for functionality provided via the added contextual tab or other control may be deployed. Alternatively, if different types of functionalities are provided under the added tab or control for which key tips may be less suitable, for example, the display of a number images in a gallery of images for applying formatting properties to a selected object, where the number of images may be large and may change from time-to-time, key tips may not be provided, but the user may select from the provided functionalities in a conventional manner, for example, by mouse click on an associated functionality control.

Figure 8:
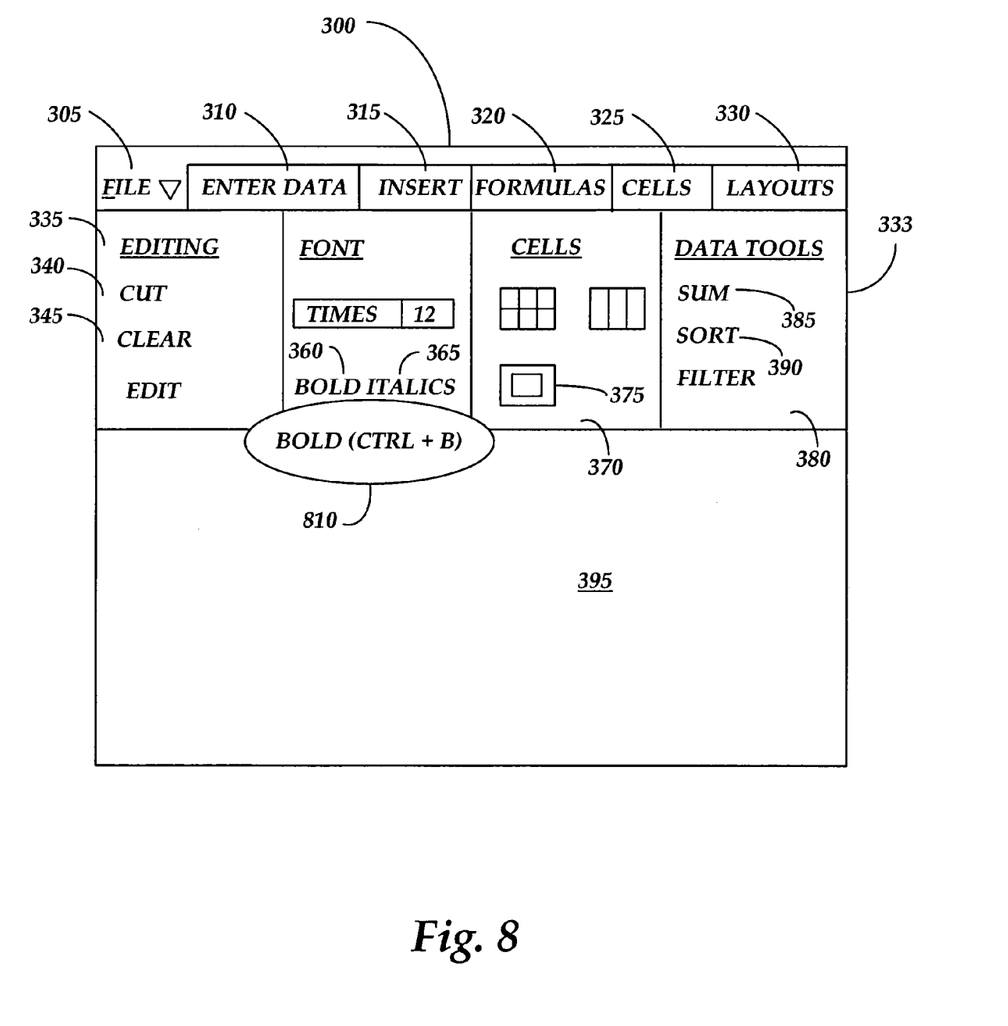
FIG. 8 illustrates the deployment of a tool tip user interface component in association with the computer screen display illustrated in FIG. 3.

Referring now to FIG. 8, a tool tip 810 is displayed in proximity to a "Bold" function illustrated in the user interface 300. According to embodiments of the present invention, tool tips, such as the tool tip 810, may be provided in response to a hover-over or other focus on a given functionality button or control for providing helpful information as to a keyboard accelerator combination that may be utilized for executing the associated functionality.

Figure 9:
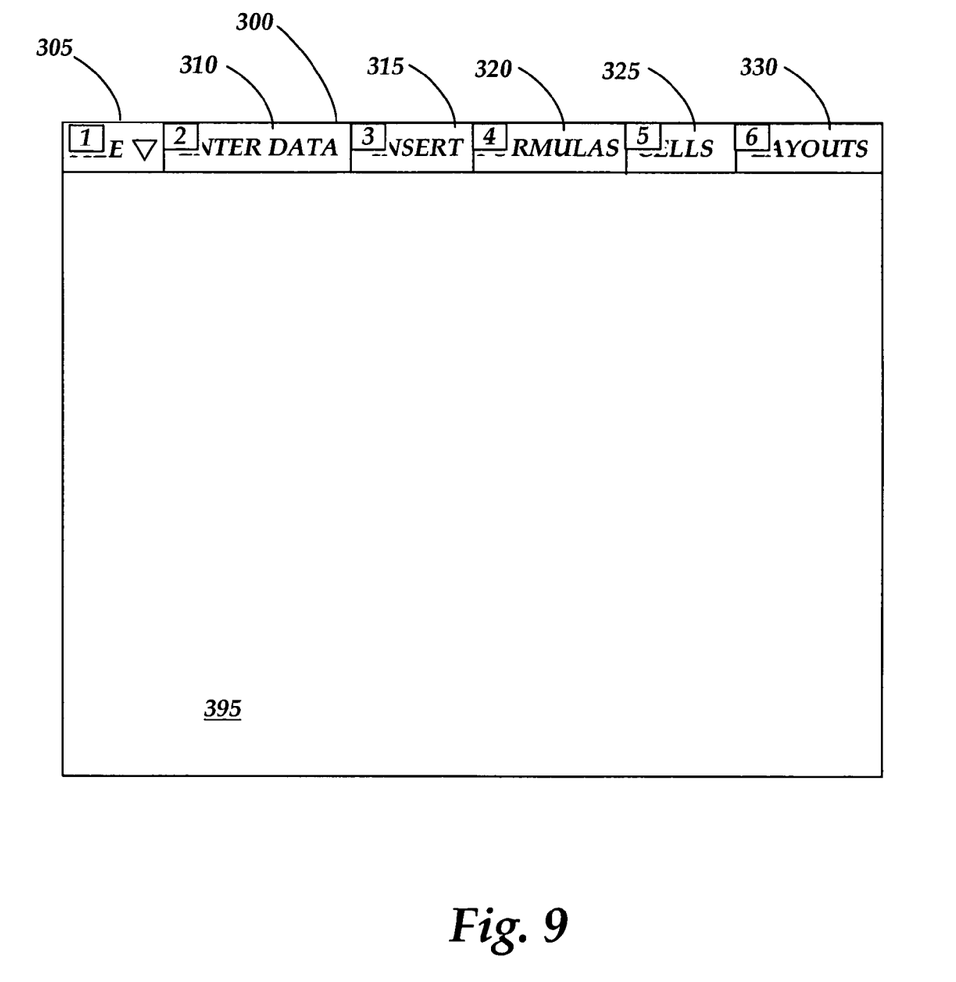
FIG. 9 illustrates a collapsed version of the user interface illustrated in FIG. 3 where the logical groupings of functionality controls are collapsed from view.

Referring now to FIG. 9, the user interface 300 is illustrated in a collapsed form. In the collapsed form, logical groupings of functionality buttons and controls associated with one of the top-level tabs 305-330 are not visible to the user. As should be appreciated, the collapsed form of the user interface 300 may be selected by users who desire additional space in the work area 395 for entering and editing data. According to embodiments of the present invention, if a keyboard accelerator key tip for one of the top-level tabs is selected, the logical groupings of functionality buttons and controls associated with the selected top-level tab are automatically deployed, as illustrated above in FIG. 3, and the keyboard accelerator key tips for each button or control are automatically displayed over corresponding buttons or controls. After a given button or control from the expanded user interface 300 is selected via a keyboard accelerator, the associated functionality is automatically applied, and the user interface 300 then returns back to a collapsed state.

As described herein, improved keyboard accelerators are provided for allowing the selection of functionalities of a given software application without the need for navigating through one or more menus of controls for locating selectable controls associated with desired functionalities. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

We claim:

1. A method for providing a keyboard accelerator for selecting software application functionality, comprising:

providing a plurality of functionalities available from a first software application;

receiving at least one third-party keyboard accelerator key tip associated with at least one additional functionality provided by a third party add-in software application to the first software application;

displaying in a user interface a selectable control for each of the plurality of functionalities and the at least one additional functionality, wherein the selectable control is localized according to a display language;

if the at least one third-party keyboard accelerator key tip has the same label as one or more keyboard accelerator key tips associated with the first software application, adding an additional text character to the third-party keyboard accelerator tip;

displaying both keyboard accelerator key tips associated with the first software application and the at least one third-party keyboard accelerator key tip over corresponding selectable controls, each keyboard accelerator key tip including at least two text characters for identifying each underlying selectable control, wherein the at least two text characters are independent of the display language;

receiving a selection of a first character of a given keyboard accelerator key tip;

if the first text character of the given keyboard accelerator key tip is identical to a first character of another keyboard accelerator key tip corresponding to another selectable control, dismissing from display any displayed keyboard accelerator key tips except the given keyboard accelerator key tip and the another keyboard accelerator key tip;

upon receiving a selection of a second text character disposed on one of the still displayed keyboard accelerator key tips, automatically executing a functionality associated with a selectable control laying under the selected keyboard accelerator key tip.

2. The method of claim 1, whereby displaying both keyboard accelerator key tips associated with the first software application and the at least one third-party keyboard accelerator key tip over the corresponding selectable controls comprises displaying a keyboard accelerator key tip over each of the corresponding selectable controls in response to receiving a selection of a keyboard accelerator initiation key.

3. The method of claim 2, whereby receiving a selection of a keyboard accelerator initiation key includes receiving a selection of a keyboard alternate (ALT) key.

4. The method of claim 2, whereby receiving a selection of a keyboard accelerator initiation key includes receiving a selection of a keyboard control (CTRL) key.

5. The method of claim 2, further comprising:

organizing the plurality of functionalities according to one or more tasks that may be performed with the first software application;

providing in the user interface a user interface tab for each of the one or more tasks;

providing in the user interface one or more selectable controls for selecting one or more functionalities organized under a first task associated with a selected user interface tab; and whereby upon receiving a selection of a keyboard accelerator initiation key, displaying a keyboard accelerator key tip over each user interface tab and over each of the one or more selectable controls.

6. The method of claim 5, further comprising:

receiving a selection of a given keyboard accelerator key tip displayed over a given user interface tab; and in response to receiving a selection of a given keyboard accelerator key tip displayed over a given user interface tab, providing in the user interface one or more selectable controls for selecting one or more functionalities organized under a second task associated with the given user interface tab.

7. The method of claim 1, whereby displaying both keyboard accelerator key tips associated with the first software application and the at least one third-party keyboard accelerator key tip over the corresponding selectable controls comprises overlaying each of the corresponding selectable controls with a display window for displaying an identification for each respective underlying selectable control.

8. The method of claim 7, whereby displaying both keyboard accelerator key tips associated with the first software application and the at least one third-party keyboard accelerator key tip over the corresponding selectable controls comprises disposing the at least two text characters on a display area of each keyboard accelerator key tip, the display area being distinguished by one of: coloring, brightness, and shading different from other components of the user interface.

9. The method of claim 8, wherein the second text character is added to the display area of one of two displayed keyboard accelerator key tips for distinguishing the two displayed keyboard accelerator key tips, if the first characters of the two displayed keyboard accelerator key tips are the same.

10. The method of claim 9, wherein the given keyboard accelerator key tip and the another keyboard accelerator key tip correspond to related selectable controls.

11. A computer storage medium containing computer executable instructions which when executed by a computer perform a method for providing a keyboard accelerator for selecting software application functionality, the instructions comprising:

providing a plurality of functionalities available from a first software application;

receiving at least one third-party keyboard accelerator key tip associated with at least one additional functionality provided by a third party add-in software application to the first software application;

displaying in a user interface a selectable control for each of the plurality of functionalities and the at least one additional functionality, wherein the selectable control is localized according to a display language;

if the at least one third-party keyboard accelerator key tip has the same label as one or more keyboard accelerator key tips associated with the first software application, adding an additional text character to the third-party keyboard accelerator tip;

displaying a both keyboard accelerator key tip tips associated with the first software application and the at least one third-party keyboard accelerator key tip over at least one corresponding selectable control in response to receiving a selection of a keyboard accelerator initiation key, wherein the keyboard accelerator key tip includes two text characters with the second text character being added to the display area of one of two displayed keyboard accelerator key tips with same first characters for distinguishing the two displayed keyboard accelerator key tips and wherein the at least two text characters are independent of the display language;

receiving a selection of a first character of a given keyboard accelerator key tip;

if the first text character of the given keyboard accelerator key tip is identical to a first character of another keyboard accelerator key tip corresponding to another selectable control, dismissing from display any displayed keyboard accelerator key tips except the given keyboard accelerator key tip and the another keyboard accelerator key tip; and upon receiving a selection of a second text character disposed on one of the still displayed keyboard accelerator key tips, automatically executing a functionality associated with a selectable control laying under the selected keyboard accelerator key tip.

12. The computer storage medium of claim 11, wherein displaying both keyboard accelerator key tips over each selectable control includes disposing the two text characters on a display area of each keyboard accelerator key tip the display area being distinguished by one of: coloring and shading different from other components of the user interface.

13. The computer storage medium of claim 12, wherein receiving a selection of the keyboard accelerator key tip includes receiving a selection of two keyboard key entries corresponding to the two text characters disposed on the display area of the selected keyboard accelerator key tip.

14. The computer storage medium of claim 13, wherein the given keyboard accelerator key tip and the another keyboard accelerator key tip correspond to related selectable controls.

15. A method for providing a keyboard accelerator for selecting software application functionality, comprising:

displaying in a user interface a selectable control for each of a plurality of functionalities available from a first software application, wherein the selectable control is localized according to a display language;

receiving a third-party selectable control associated with at least one additional functionality provided by a third party add-in software application to the first software application, wherein the third-party selectable control is localized according to the display language;

in response to receiving a selection of a keyboard accelerator initiation key, overlaying each selectable control with a display window for displaying two identification characters for each respective underlying selectable control, wherein the second identification character is added to a display area of one of two display windows for distinguishing the two display windows if the two display windows overlaying two respective selectable controls include the same first identification character and wherein the two identification characters are independent of the display language;

if the third-party selectable control has the same two identification characters as one or more of the selectable controls associated with the first software application, altering the second identification character of the third-party selectable control;

receiving a selection of a first identification character via a keyboard selection of the given identification characters;

dismissing from display any displayed two identification characters that do not match the first identification character; and upon receiving a selection of a second identification character disposed on one of the still displayed two identification characters, automatically executing a functionality associated with a selectable control laying under a display window bearing the selected identification characters.

16. The method of claim 15, whereby overlaying each selectable control with a display window for displaying an identification character for each respective underlying selectable control further includes disposing on a display area of each display window two text characters for identifying each underlying selectable control.

* * * * *

UNITED STATES PATENT AND TRADEMARK OFFICE
CERTIFICATE OF CORRECTION

| | | |
|---|---|---|
| PATENT NO. | : 7,661,074 B2 | Page 1 of 1 |
| APPLICATION NO. | : 11/173630 | |
| DATED | : February 9, 2010 | |
| INVENTOR(S) | : Jennifer Sadler et al. | |

It is certified that error appears in the above-identified patent and that said Letters Patent is hereby corrected as shown below:

In column 14, line 54, in Claim 11, delete "a both" and insert -- both --, therefor.

In column 14, line 54, in Claim 11, delete "tip tips" and insert -- tips --, therefor.

Signed and Sealed this
Tenth Day of May, 2011

David J. Kappos
*Director of the United States Patent and Trademark Office*